United States Patent
Pu et al.

(10) Patent No.: US 10,572,077 B2
(45) Date of Patent: Feb. 25, 2020

(54) SELF-CAPACITIVE TOUCH ELECTRODE STRUCTURE, TOUCH DISPLAY PANEL AND TOUCH DISPLAY APPARATUS HAVING THE SAME

(71) Applicants: BOE TECHNOLOGY GROUP CO., LTD., Beijing (CN); HEFEI BOE OPTOELECTRONICS TECHNOLOGY CO., LTD., Hefei (CN)

(72) Inventors: Xun Pu, Beijing (CN); Hongmin Li, Beijing (CN)

(73) Assignees: BOE TECHNOLOGY GROUP CO., LTD., Beijing (CN); HEFEI BOE OPTOELECTRONICS TECHNOLOGY CO., LTD., Hefei (CN)

( * ) Notice: Subject to any disclaimer, the term of this patent is extended or adjusted under 35 U.S.C. 154(b) by 306 days.

(21) Appl. No.: 15/501,848

(22) PCT Filed: May 20, 2016

(86) PCT No.: PCT/CN2016/082884
§ 371 (c)(1),
(2) Date: Feb. 5, 2017

(87) PCT Pub. No.: WO2017/016291
PCT Pub. Date: Feb. 2, 2017

(65) Prior Publication Data
US 2017/0228068 A1  Aug. 10, 2017

(30) Foreign Application Priority Data
Jul. 28, 2015  (CN) .......................... 2015 1 0459976

(51) Int. Cl.
*G06F 3/044* (2006.01)
*G02F 1/1333* (2006.01)
*G06F 3/041* (2006.01)

(52) U.S. Cl.
CPC .......... *G06F 3/044* (2013.01); *G02F 1/13338* (2013.01); *G06F 3/0412* (2013.01); *G06F 3/0416* (2013.01); *G02F 2201/121* (2013.01)

(58) Field of Classification Search
None
See application file for complete search history.

(56) References Cited

U.S. PATENT DOCUMENTS

2014/0125626 A1* 5/2014 Yang ................. G02F 1/134336
345/174
2014/0313169 A1* 10/2014 Kravets .................. G06F 3/044
345/178

(Continued)

FOREIGN PATENT DOCUMENTS

CN   101923419 A   12/2010
CN   103677431 A    3/2014

(Continued)

OTHER PUBLICATIONS

Decision of Rejection in the Chinese Patent Application No. 201510459976.X, dated Jan. 10, 2018; English translation attached.

(Continued)

*Primary Examiner* — Stephen T. Reed
(74) *Attorney, Agent, or Firm* — Intellectual Valley Law, P.C.

(57) ABSTRACT

The present application discloses a self-capacitive touch electrode structure comprising a first sub-array comprising a plurality of first touch electrodes in a first periodic sub-lattice, and a second sub-array comprising a plurality of second touch electrodes in a second periodic sub-lattice. The first sub-array and the second sub-array define an array of (Continued)

touch electrodes comprising a plurality of touch electrode pairs in a periodic lattice, a minimum translational repeat unit of the array of touch electrodes comprising a pair of first touch electrode and second touch electrode adjacent to each other. Each first touch electrode comprises at least one recess surrounding a protrusion of an adjacent second touch electrode, and at least one protrusion surrounded by a recess in an adjacent second touch electrode. Each of the plurality of first touch electrodes and the plurality of second touch electrodes is independently connected to a touch signal line.

13 Claims, 10 Drawing Sheets

(56) References Cited

U.S. PATENT DOCUMENTS

2015/0097801 A1* 4/2015 Trend ................ G06F 3/046
  345/174
2016/0018926 A1* 1/2016 Nam ................ G06F 3/044
  345/174
2016/0291791 A1* 10/2016 Qian ................ G06F 3/0418

FOREIGN PATENT DOCUMENTS

| | | |
|---|---|---|
| CN | 103793120 A | 5/2014 |
| CN | 104020906 A | 9/2014 |
| CN | 104020911 A | 9/2014 |
| JP | 2010117829 A | 5/2010 |

OTHER PUBLICATIONS

International Search Report & Written Opinion dated Aug. 22, 2016 regarding PCT/CN2016/082884.
First Office Action in the Chinese Patent Application No. 201510459976.X, dated Jun. 28, 2017; English translation attached.
Second Office Action in the Chinese Patent Application No. 201510459976.X, dated Sep. 22, 2017; English translation attached.

* cited by examiner

SELF-CAPACITIVE TOUCH ELECTRODE STRUCTURE, TOUCH DISPLAY PANEL AND TOUCH DISPLAY APPARATUS HAVING THE SAME

CROSS-REFERENCE TO RELATED APPLICATION

This application claims priority to Chinese Patent Application No. 201510459976.X, filed Jul. 28, 2015, the contents of which are incorporated by reference in the entirety.

TECHNICAL FIELD

The present invention relates to display technology, more particularly, to a self-capacitive touch electrode structure, and a touch display panel and a touch display apparatus having the same.

BACKGROUND

Touch display panels have found a wide range of applications in the display field. Touch display panels can be categorized into three classes: add-on mode touch panels, on-cell touch panels, and in-cell touch panels. The add-on mode touch panels may be fabricated separated from the display panels (e.g., a liquid crystal display panel), and may be adhered onto the display panels. The on-cell touch panels have the disadvantages of high manufacturing costs, low light transmission rate, and being relatively thick. The in-cell touch control technology integrates the touch sensor within the display unit. Thus, the thickness of the display panel and the manufacturing costs may be greatly reduced. Touch display panels may be a self-capacitive type or a mutual capacitive type touch display panel. FIG. 1 is a diagram illustrating the structure of a conventional self-capacitive touch electrode structure. Referring to FIG. 1, the conventional touch electrode structure includes a plurality of self-capacitive touch electrodes 10' insulated from each other and in a same layer. Each self-capacitive touch electrodes 10' is substantially a square shape. Each self-capacitive touch electrodes 10' is connected through a touch electrode signal line to a pin 30' of a flexible printed circuit bonding 20'. During touch control, a touch event may be detected by a capacitance change induced by a touch on the touch electrodes.

SUMMARY

In one aspect, the present invention provides a self-capacitive touch electrode structure comprising a first sub-array comprising a plurality of first touch electrodes in a first periodic sub-lattice, and a second sub-array comprising a plurality of second touch electrodes in a second periodic sub-lattice. Each first touch electrode comprises at least one recess surrounding a protrusion of an adjacent second touch electrode, and at least one protrusion surrounded by a recess in an adjacent second touch electrode.

Optionally, the first sub-array and the second sub-array define an array of touch electrodes comprising a plurality of touch electrode pairs in a periodic lattice, a minimum translational repeat unit of the array of touch electrodes comprising a pair of first touch electrode and second touch electrode adjacent to each other.

Optionally, each of the plurality of first touch electrodes and the plurality of second touch electrodes is independently connected to a touch signal line.

Optionally, a projection of a first touch electrode along any lattice line of the array of touch electrodes at least partially overlaps with a projection of an adjacent second touch electrode.

Optionally, the first sub-array interleaves with the second sub-array.

Optionally, a pair the first periodic sub-lattice and the second periodic sub-lattice has a two-fold rotational symmetry relative to an axis perpendicular to a plane of the array, and the pair of first touch electrode and second touch electrode adjacent to each other has a two-fold rotational symmetry relative to an axis perpendicular to a plane of the array, and identical shape and dimension.

Optionally, each touch electrode has a substantially H shape, comprising a first portion, a second portion, and a third portion sandwiched between the first portion and the second portion; the first portion is substantially parallel to the second portion and substantially perpendicular to the third portion; the first portion, the second portion, and the third portion form a first recess and a second recess; the first portion comprises a first protrusion and a second protrusion, and the second portion comprises a third protrusion and a fourth protrusion.

Optionally, a first recess of a first touch electrode surrounding a first protrusion of a first adjacent second touch electrode, a second recess of the first touch electrode surrounding a second protrusion of a second adjacent second touch electrode; a first recess of a second touch electrode surrounding a first protrusion of a first adjacent first touch electrode, a second recess of the second touch electrode surrounding a second protrusion of a second adjacent first touch electrode.

Optionally, the first portion has a length different from that of the second portion.

Optionally, the pair of first touch electrode and second touch electrode has a two-fold rotational symmetry in plan view of the array.

Optionally, the first portion has a length in the range of about 10 mm to about 12 mm, and a width in the range of about 1 mm to about 3 mm; the second portion has a length in the range of about 8 mm to about 10 mm, and a width in the range of about 1 mm to about 3 mm; and the third portion has a length in the range of about 1 mm to about 3 mm, and a width in the range of about 1 mm to about 3 mm.

Optionally, each touch electrode has a substantially T shape, comprising a first portion and a second portion substantially perpendicular to the first portion.

Optionally, the first portion and the second portion are substantially rectangular.

Optionally, the first portion is a rectangle, and the second portion is substantially trapezoidal.

Optionally, each touch electrode has a substantially airplane shape, comprising a nose portion, a fuselage portion, a wing portion, and a tail portion.

Optionally, the wing portion is substantially rectangular, the nose portion is substantially rectangular and is substantially perpendicular to the wing portion, the fuselage portion is substantially rectangular or a square, and the tail portion is substantially trapezoidal or a triangular.

Optionally, each touch electrode comprises a first rectangular portion, a second rectangular portion and a third rectangular portion on two sides of the first rectangular portion, and a fourth trapezoidal portion connected to the third rectangular portion, the first rectangular portion and the fourth trapezoidal portion spaced apart by the third rectangular portion.

Optionally, the self-capacitive touch electrode structure further comprises a touch detection chip connected to the plurality of first touch electrodes and the plurality of second touch electrodes for detecting touch positions based on a change in capacitance in each touch electrode.

Optionally, the plurality of first touch electrodes and the plurality of second touch electrodes are connected to the touch detection chip through a plurality of touch signal lines in a different layer.

In another aspect, the present invention provides a touch control display panel, comprising the touch electrode structure described herein.

Optionally, the touch control display panel further comprises a first display substrate and a second display substrate opposite to the first display substrate, wherein the second display substrate comprises the touch electrode structure, and a common electrode layer in a same layer as the touch electrode structure.

In another aspect, the present invention provides a display apparatus comprising a touch control display panel described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

In a conventional touch electrode structure, each self-capacitive touch electrode is respectively connected to a pin of a flexible printed circuit board. The defects of the manufacturing are increased as the number of pins increase.

The present disclosure provides a touch electrode structure that overcomes the disadvantages of the conventional touch electrode structure. In some embodiments, the self-capacitive touch electrode structure includes a first sub-array having a plurality of first touch electrodes in a first periodic sub-lattice, and a second sub-array having a plurality of second touch electrodes in a second periodic sub-lattice. The first sub-array and the second sub-array define an array of touch electrodes having a plurality of touch electrodes in a periodic lattice. A minimum translational repeat unit of the array of touch electrodes includes a pair of first touch electrode and second touch electrode adjacent to each other (i.e., a first touch electrode alone is insufficient to constitute the minimum translational repeat unit of the array of touch electrodes; a second touch electrode alone is also insufficient to constitute the minimum translational repeat unit of the array of touch electrodes). Each of the plurality of touch electrodes (e.g., each of the plurality of first touch electrodes and the plurality of second touch electrodes) is independently connected to a touch signal line. Optionally, a projection of a first touch electrode along any lattice line at least partially overlaps with a projection of an adjacent second touch electrode. Optionally, a projection of a first touch electrode along a first lattice line at least partially overlaps with a projection of an adjacent second touch electrode, and a projection of a first touch electrode along a second lattice line at least partially overlaps with a projection of an adjacent second touch electrode. As used herein, the term "lattice line" refers to a straight line connecting a plurality of lattice points of an array. For example, the array of touch electrodes according to the present disclosure is a two-dimensional array having a two-dimensional lattice of touch electrode pairs in which the first touch electrodes and the second touch electrodes are in a same layer. The lattice line is a straight line connecting a plurality of lattice points (e.g., a lattice point may be a center of mass of a pair of first touch electrode and second touch electrode adjacent to each other).

Figure 1:
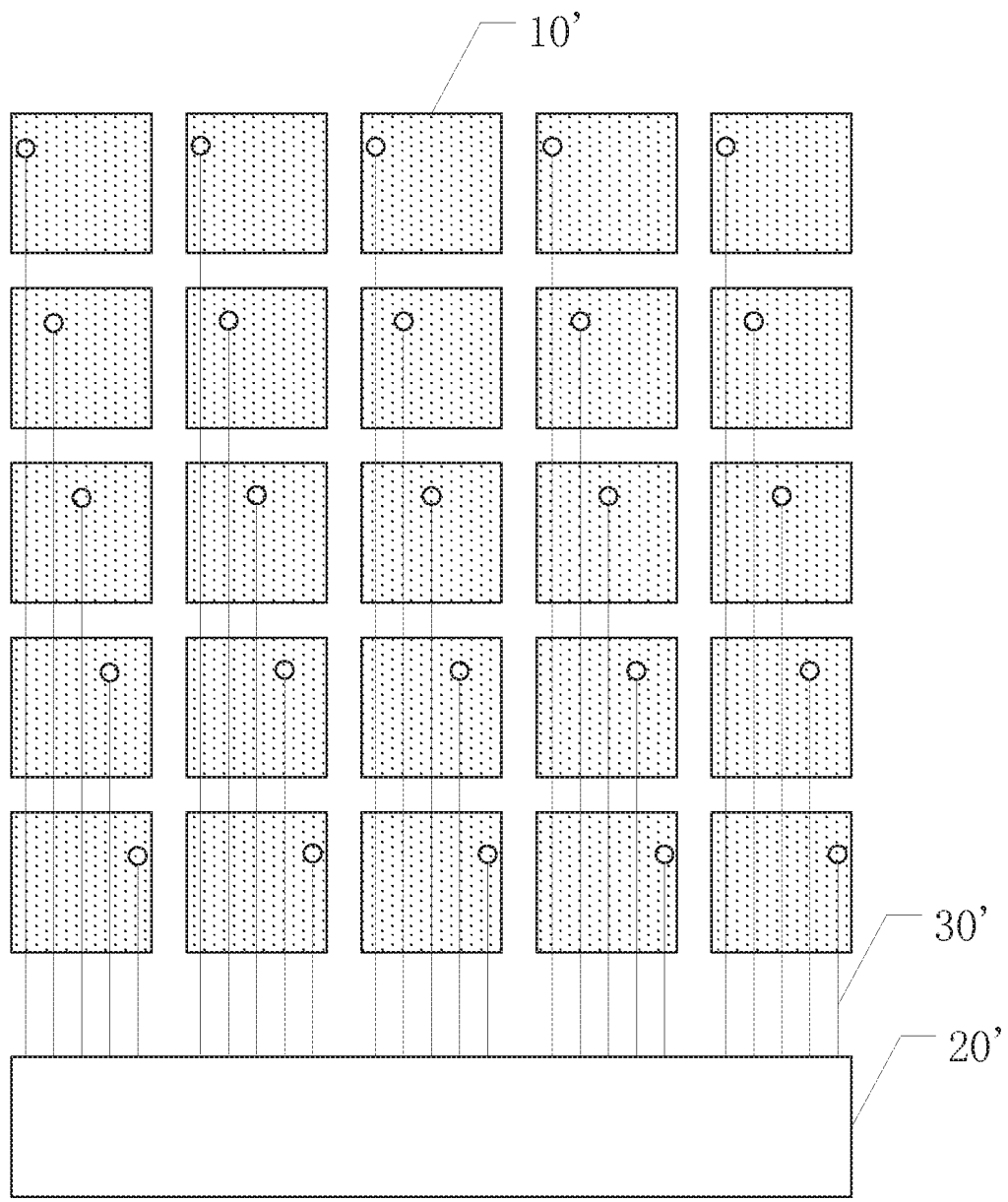
FIG. 1 is a diagram illustrating a conventional self-capacitive touch electrode structure.
Figure 2:
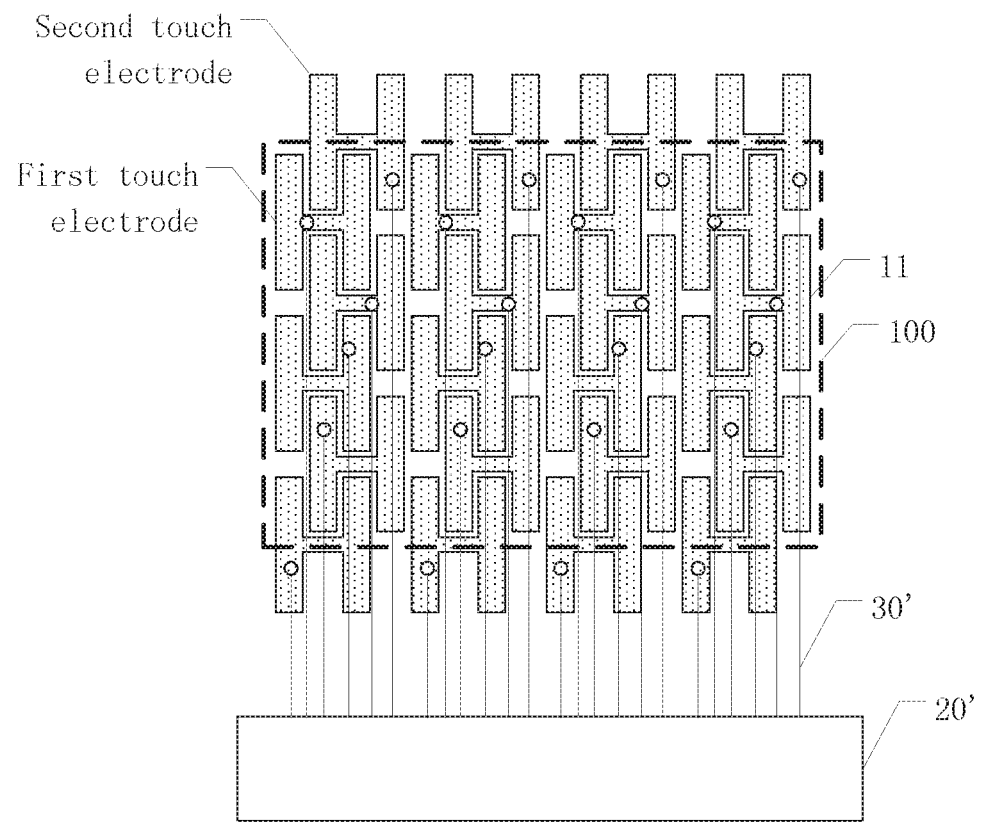
FIG. 2 is a diagram illustrating a self-capacitive touch electrode structure in some embodiments.

Optionally, the first touch electrode and the second touch electrode have substantially the same shape, dimension, and orientation (see, e.g., FIG. 2). In that case, the first touch electrode and the second touch electrode are substantially the same in every aspect except for the positional difference. Optionally, the first touch electrode and the second touch electrode have substantially the same shape and dimension, but not the same orientation (see, e.g., FIGS. 4, 6, 10, 11-13). Optionally, the pair of first touch electrode and second touch electrode has a two-fold rotational symmetry in plan view of the array, and have identical shape and dimension see, e.g., FIGS. 2, 4, 6, 10, 11-13). Optionally, the pair of first touch electrode and second touch electrode has similar but not identical shapes and dimensions, and has a quasi-two-fold rotational symmetry in plan view of the array (see, e.g., FIG. 14).

Optionally, the pair of the first periodic sub-lattice and the second periodic sub-lattice has a two-fold rotational symmetry in plan view of the array (see, e.g., FIGS. 2, 4, 6, 10, 11-13). Optionally, the pair of the first periodic sub-lattice and the second periodic sub-lattice has a quasi-two-fold rotational symmetry in plan view of the array (see, e.g., FIG. 14). Optionally, the first periodic sub-lattice interleaves with the second periodic sub-lattice (see, e.g., FIGS. 2, 4, 6, 10, 12-14).

In some embodiments, each first touch electrode includes at least one recess surrounding a protrusion of an adjacent second touch electrode (see, e.g., FIGS. 2, 4, 6, 10, 12-14).

Optionally, each second touch electrode includes at least one recess surrounding a protrusion of an adjacent first touch electrode. Optionally, each first touch electrode includes at least one protrusion surrounded by a recess in an adjacent second touch electrode. Optionally, each second touch electrode includes at least one protrusion surrounded by a recess in an adjacent first touch electrode. Optionally, each first touch electrode includes at least one recess surrounding a protrusion of an adjacent second touch electrode, and at least one protrusion surrounded by a recess in an adjacent second touch electrode. Optionally, each second touch electrode includes at least one recess surrounding a protrusion of an adjacent first touch electrode, and at least one protrusion surrounded by a recess in an adjacent first touch electrode. Optionally, each first touch electrode includes at least one recess surrounding a protrusion of an adjacent second touch electrode, and at least one protrusion surrounded by a recess in an adjacent second touch electrode; and each second touch electrode includes at least one recess surrounding a protrusion of an adjacent first touch electrode, and at least one protrusion surrounded by a recess in an adjacent first touch electrode.

Various appropriate shapes and dimensions may be adopted for making the first touch electrode and the second touch electrode. Examples of shapes include, but are not limited to, a substantially H-shape, a substantially T-shape, a substantially Y-shape, a substantially K-shape, and a substantially airplane shape, etc.

FIG. 2 is a diagram illustrating a self-capacitive touch electrode structure in some embodiments. Referring to FIG. 2, the self-capacitive touch electrode structure in the embodiment includes a plurality of self-capacitive touch electrodes 11 having a substantially 'H' shape in a same layer spaced apart from each other.

Figure 3:
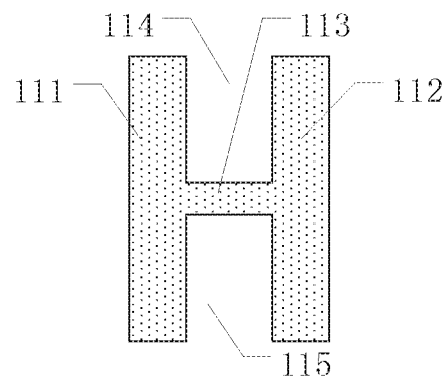
FIG. 3 is a diagram illustrating the shape of a self-capacitive touch electrode in some embodiments.

FIG. 3 is a diagram illustrating the shape of a self-capacitive touch electrode in some embodiments. Referring to FIG. 3, each H-shape self-capacitive touch electrode in the embodiment includes one horizontal portion 113, a first vertical portion 111 and a second vertical portion 112 substantially parallel to each other. The horizontal portion 113, the first vertical portion 111, and the second vertical portion 112 form two recesses, specifically, an upper recess 114 and a lower recess 115.

In the touch electrode structure as shown in FIG. 2 and FIG. 3, all "H" shape self-capacitive touch electrodes 11 have substantially the same shape, dimension, and orientation. In each "H" shape self-capacitive touch electrode 11, one of the vertical portions (e.g., the first vertical portion 111) from an adjacent self-capacitive touch electrode 11 protrudes into the upper recess 114, and one of the vertical portions (e.g., the first vertical portion 111) from another adjacent self-capacitive touch electrode 11 protrudes into the lower recess 115.

For instance, each substantially H-shape self-capacitive touch electrode 11 within the dash-line box 100 in FIG. 2 includes a vertical portion (e.g., the first vertical portion 111), which has a first protrusion and a second protrusion. The first protrusion extends into and is surrounded by a recess from a self-capacitive touch electrode 11 above, the second protrusion extends into and is surrounded by a recess from a self-capacitive touch electrode 11 below. Thus, except for the touch electrodes 11 in the top row and bottom row, each substantially H-shape self-capacitive touch electrode 11 in the touch electrode structure of FIG. 2 abuts two adjacent touch electrodes 11, each of which includes a protrusion that extends and protrudes into a recess of the touch electrode 11. By designing the touch electrode 11 to have appropriate electrode dimensions, a minimum number of two touch electrodes 11 may be involved during a touch event.

The top row and the bottom row of the touch electrode structure as shown in FIG. 2 abut only one adjacent row of touch electrodes. Accordingly, only one recess (e.g., the bottom recess 115 in the top row, or the top recess 114 in the bottom row) of these touch electrodes 11 surrounds a protrusion from an adjacent touch electrode 11 from an adjacent row. Optionally, the top row and the bottom row of the touch electrode structure are designed to be invalid touch regions (e.g., peripheral regions), and the area within the dash-line box 100 is the touch region.

Figure 4:
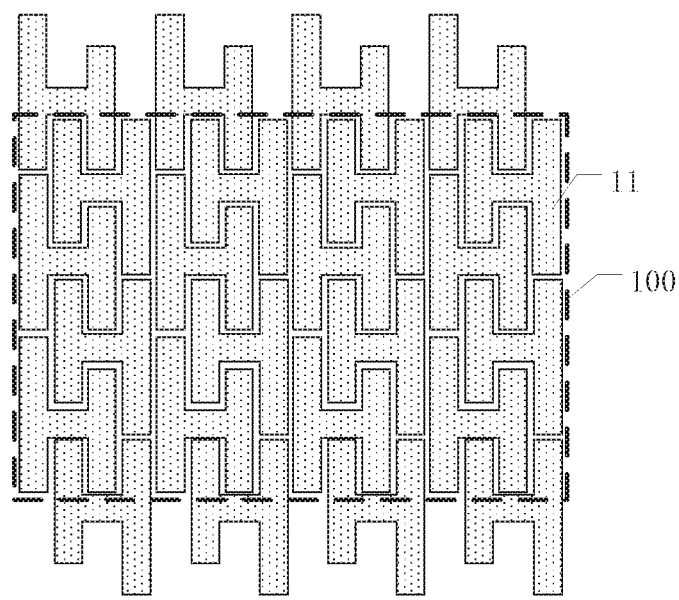
FIG. 4 is a diagram illustrating a self-capacitive touch electrode structure in some embodiments.

In some embodiments, the first vertical portion 111 and the second vertical portion 112 have different lengths. FIG. 4 is a diagram illustrating a self-capacitive touch electrode structure in some embodiments. Referring to FIG. 4, the self-capacitive touch electrode in the embodiment includes a pair of touch electrodes 11 in two adjacent rows, one touch electrode 11 in the pair is rotated relative to the other touch electrode 11 in the pair by a relative angle of 180°.

Figure 5:
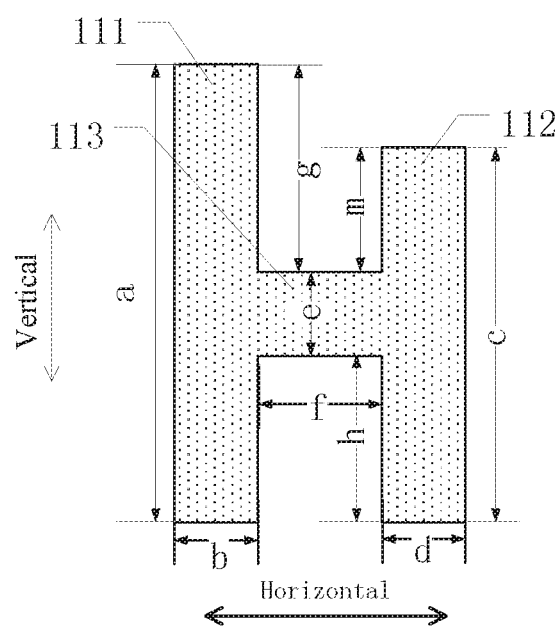
FIG. 5 is a diagram illustrating the structure of a self-capacitive touch electrode in some embodiments.
Figure 6:
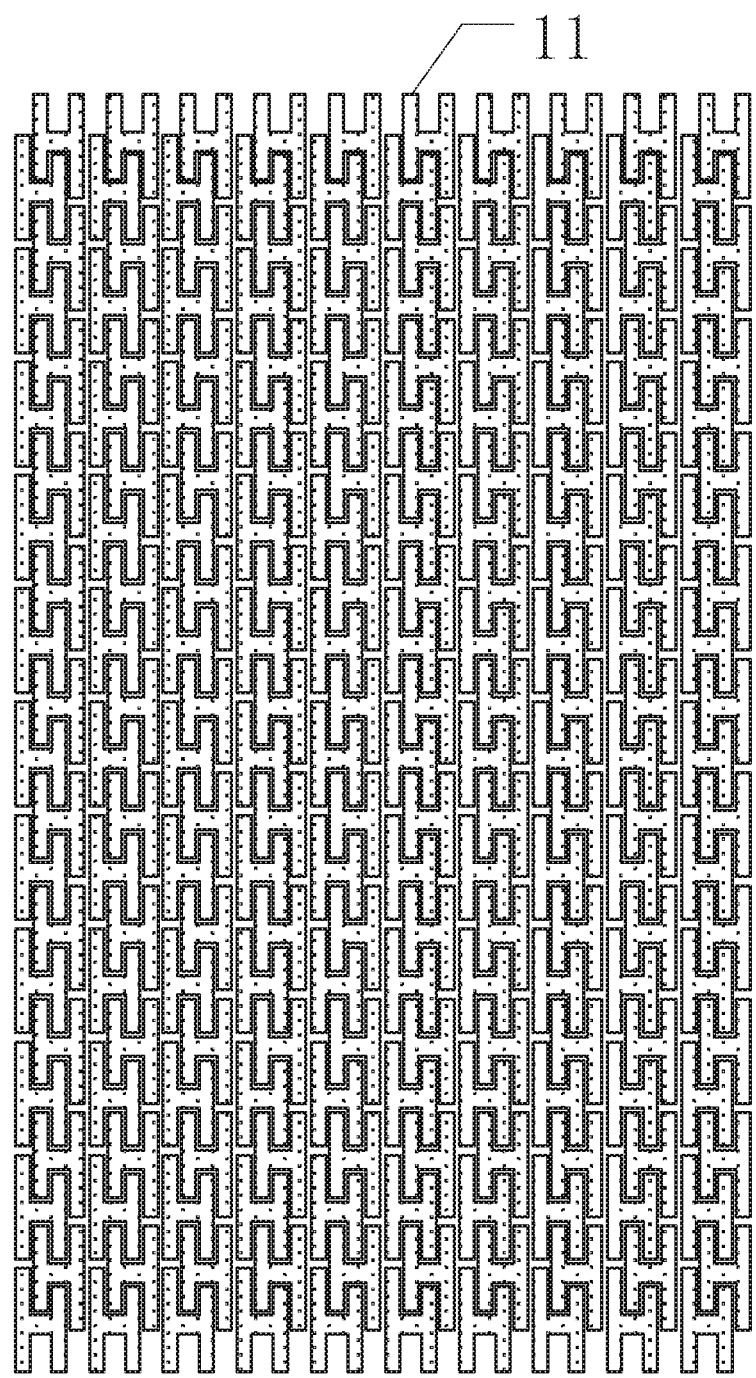
FIG. 6 is a diagram illustrating a self-capacitive touch electrode structure in some embodiments.

FIG. 5 is a diagram illustrating the structure of a self-capacitive touch electrode in some embodiments. Referring to FIG. 5, the substantially H-shape touch electrode in the embodiment includes a first vertical portion 111 and a second vertical portion 112 having different lengths, the length of the second vertical portion 112 being smaller than that of the first vertical portion 111. The substantially H-shape touch electrode in the embodiment further includes a horizontal portion 113. Optionally, the first vertical portion 111 has a length a (e.g., along the vertical direction) in the range of about 10 mm to about 12 mm, and a width b (e.g., along the horizontal direction) in the range of about 1 mm to about 3 mm. Optionally, the second vertical portion 112 has a length c (e.g., along the vertical direction) in the range of about 8 mm to about 10 mm (wherein the length c is different from the length a), and a width d (e.g., along the horizontal direction) in the range of about 1 mm to about 3 mm. Optionally, the horizontal portion 113 has a width e (e.g., along the vertical direction) in the range of about 1 mm to about 3 mm, and a length f (e.g., along the horizontal direction) in the range of about 1 mm to about 3 mm.

Figure 7:
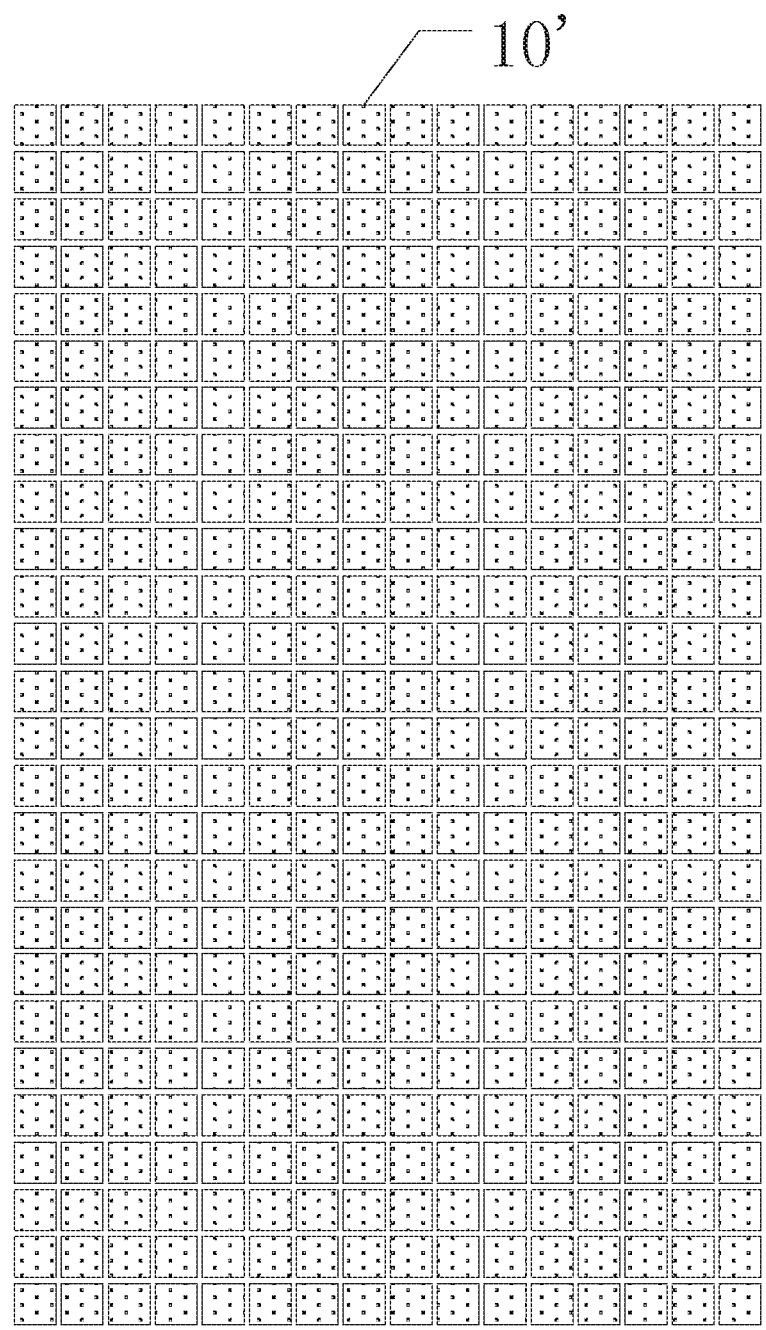
FIG. 7 is a diagram illustrating a conventional self-capacitive touch electrode structure.

Optionally, the first vertical portion 111 has a length a (e.g., along the vertical direction) of about 11 mm, and a width h (e.g., along the horizontal direction) of about 2 mm. Optionally, the second vertical portion 112 has a length c (e.g., along the vertical direction) of about 9 mm, and a width d (e.g., along the horizontal direction) of about 2 mm. Optionally, the horizontal portion 113 has a width e (e.g., along the vertical direction) of about 2 mm, and a length f (e.g., along the horizontal direction) of about 2 mm. The first vertical portion 111 includes a first protrusion and a second protrusion, the second vertical portion 112 includes a third protrusion and a fourth protrusion. Optionally, the first protrusion has a length g (i.e., the distance between the upper end of the horizontal portion 113 and the upper end of the first vertical portion 111) of about 5 mm. Optionally, the third protrusion has a length g (i.e., the distance between the upper end of the horizontal portion 113 and the upper end of the second vertical portion 111) of about 3 mm, Optionally, the fourth protrusion has a length g (i.e., the distance between the lower end of the horizontal portion 113 and the lower end of the second vertical portion 111) of about 4 mm. By having this design, about 220 self-capacitive touch electrodes are required to occupy a touch area of about 80 mm by 117 mm. In contrast, when a square-shaped self-capacitive touch electrode having a dimension of 5 mm by 5 mm is used, about 368 touch electrodes are required to occupy the same touch area (see, FIG. 7).

The present self-capacitive touch electrode structure delivers superior touch performance. As compared to a conventional touch electrode structure, a fewer number of touch electrodes in the present self-capacitive touch electrode structure are required to occupy a same touch area while achieving a better touch performance. Using a self-capacitive touch electrode structure of FIG. 7, the minimum number of touch electrodes involved in a touch event (e.g., using a 5 mm by 5 mm stylus) is doubled as compared to that of the conventional touch electrode structure of FIG. 6. Similarly, the maximum number of touch electrodes involved in a touch event (e.g., using a 5 mm by 5 mm stylus) remains the same or is increased as compared to that of the conventional touch electrode structure. Therefore, even though each electrode has a larger area than that of a conventional electrode, the touch performance is greatly enhanced. Because an electrode of a larger area may be used in the present self-capacitive touch electrode structure, the total number of pins for connecting the touch electrodes to the flexible printed circuit board for a same substrate area can be significantly reduced (e.g., by more than 20%, more than 30%, more than 35%, or more than 40%) as compared to the conventional self-capacitive touch electrode structure.

Each self-capacitive touch electrode is connected to a pin in the flexible printed circuit board. For a touch area of about 80 mm by 117 mm, about 368 pins are required in the bonding pad for connecting to square-shaped self-capacitive touch electrodes having a dimension of 5 mm by 5 mm each. By comparison, only about 220 pins are needed in the bonding pad for connecting to the H-shape self-capacitive touch electrodes of the present disclosure, i.e., a 40% reduction in numbers of pins in the bonding pad. Thus, this design greatly lowers the manufacturing costs and manufacturing defects, and produces a more compact end product.

Figure 8:
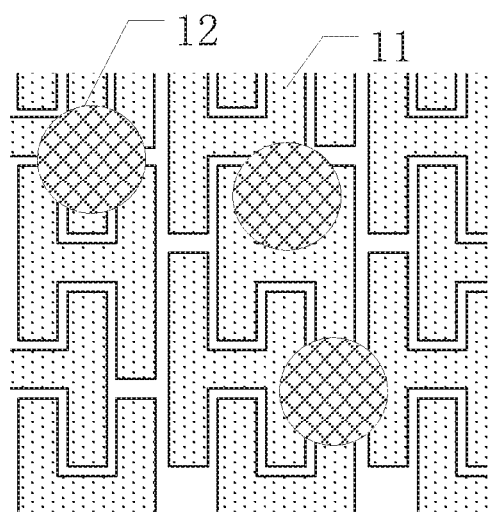
FIG. 8 is a diagram illustrating touch performance of a self-capacitive touch electrode structure in some embodiments.
Figure 9:
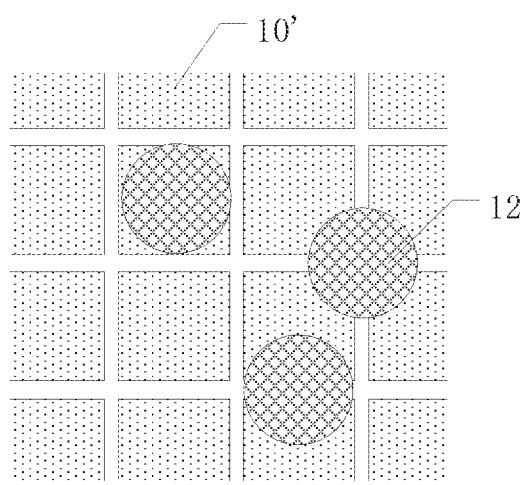
FIG. 9 is a diagram illustrating touch performance of a conventional self-capacitive touch electrode structure.

The touch performance of the present touch electrode structure may be tested using a stylus, e.g., a copper stylus 12 having a diameter of 5 mm. FIG. 8 is a diagram illustrating touch performance of a self-capacitive touch electrode structure in some embodiments. FIG. 9 is a diagram illustrating touch performance of a conventional self-capacitive touch electrode structure. Referring to FIG. 8, a copper stylus 12 having a diameter of 5 mm induces capacitance change in a minimum number of two touch electrodes, and a maximum number of four touch electrodes, in the present touch electrode structure. Referring to FIG. 9, a copper stylus 12 having a diameter of 5 mm induces capacitance change in a minimum number of only one touch electrode, and no more than four touch electrodes, in the conventional touch electrode structure. Thus, the present touch electrode structure has superior performance as compared to the conventional touch electrode structure.

Figure 10:
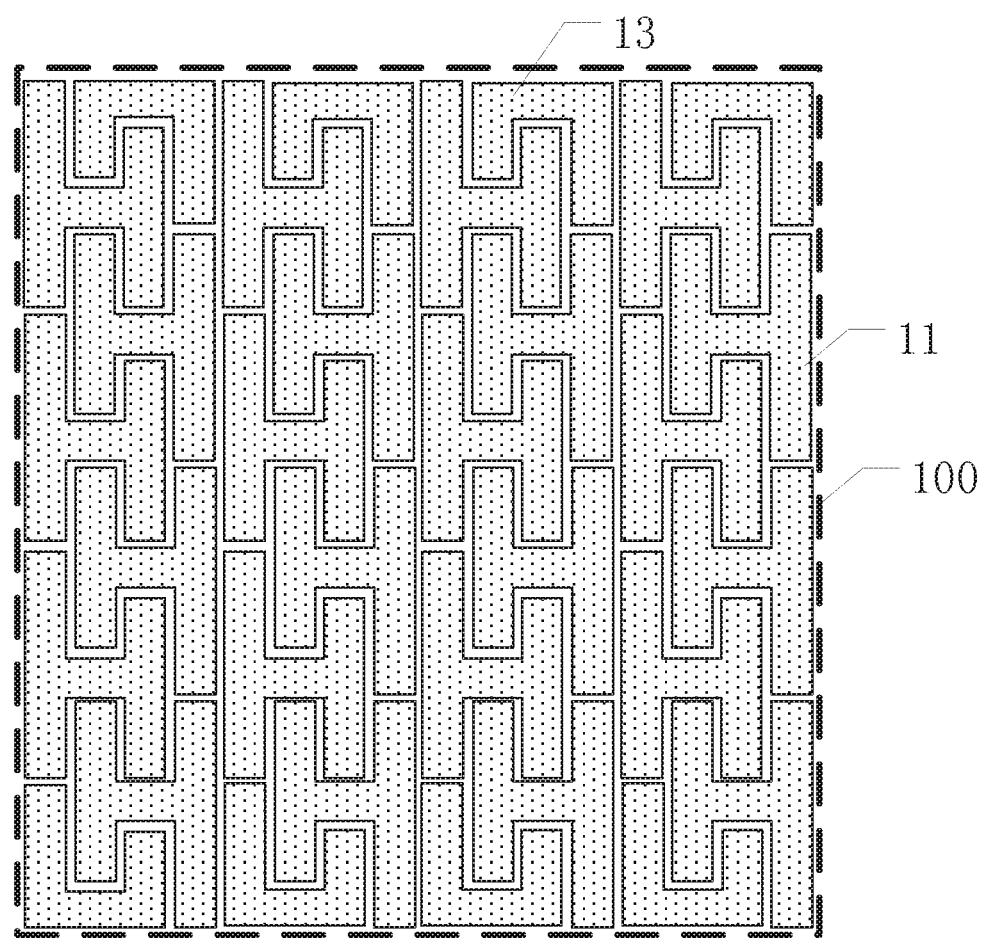
FIG. 10 is a diagram illustrating a self-capacitive touch electrode structure in some embodiments.

The touch electrode structure may include touch electrodes having a shape different from the H-shape in order to reduce the area of invalid touch regions. FIG. 10 is a diagram illustrating a self-capacitive touch electrode structure in some embodiments. Referring to FIG. 10, the touch electrode structure in the embodiment includes a top row and a bottom row of half-H shape touch electrodes, interleaving with the H-shape touch electrodes in the touch electrode structure.

Figure 11:
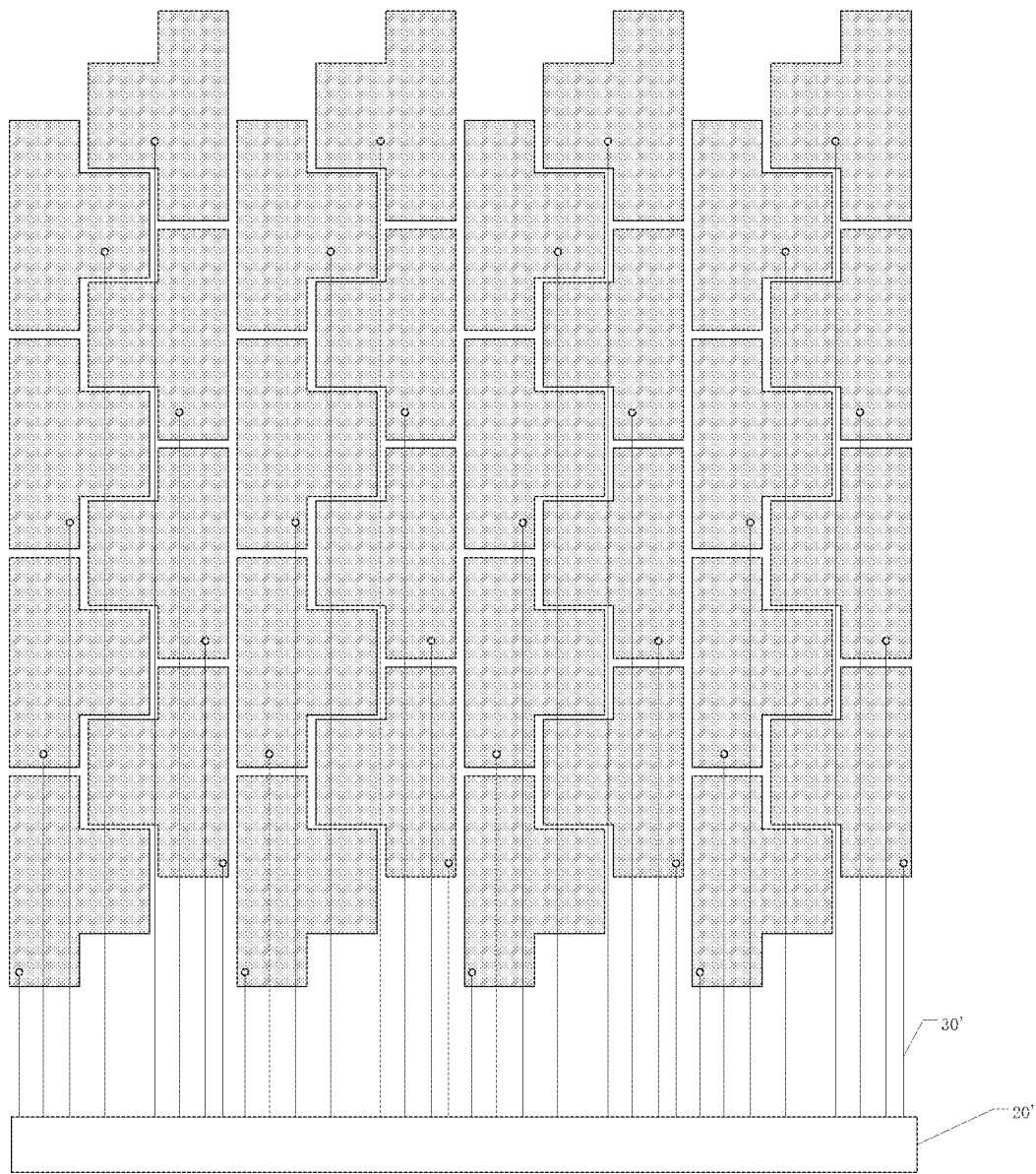
FIG. 11 is a diagram illustrating a self-capacitive touch electrode structure in some embodiments.

FIG. 11 is a diagram illustrating a self-capacitive touch electrode structure in some embodiments. Referring to FIG. 11, the self-capacitive touch electrode structure in the embodiment has a substantially T-shape, including a first portion and a second portion substantially perpendicular to the first portion. The first portion and the second portion are both substantially rectangular.

Figure 12:
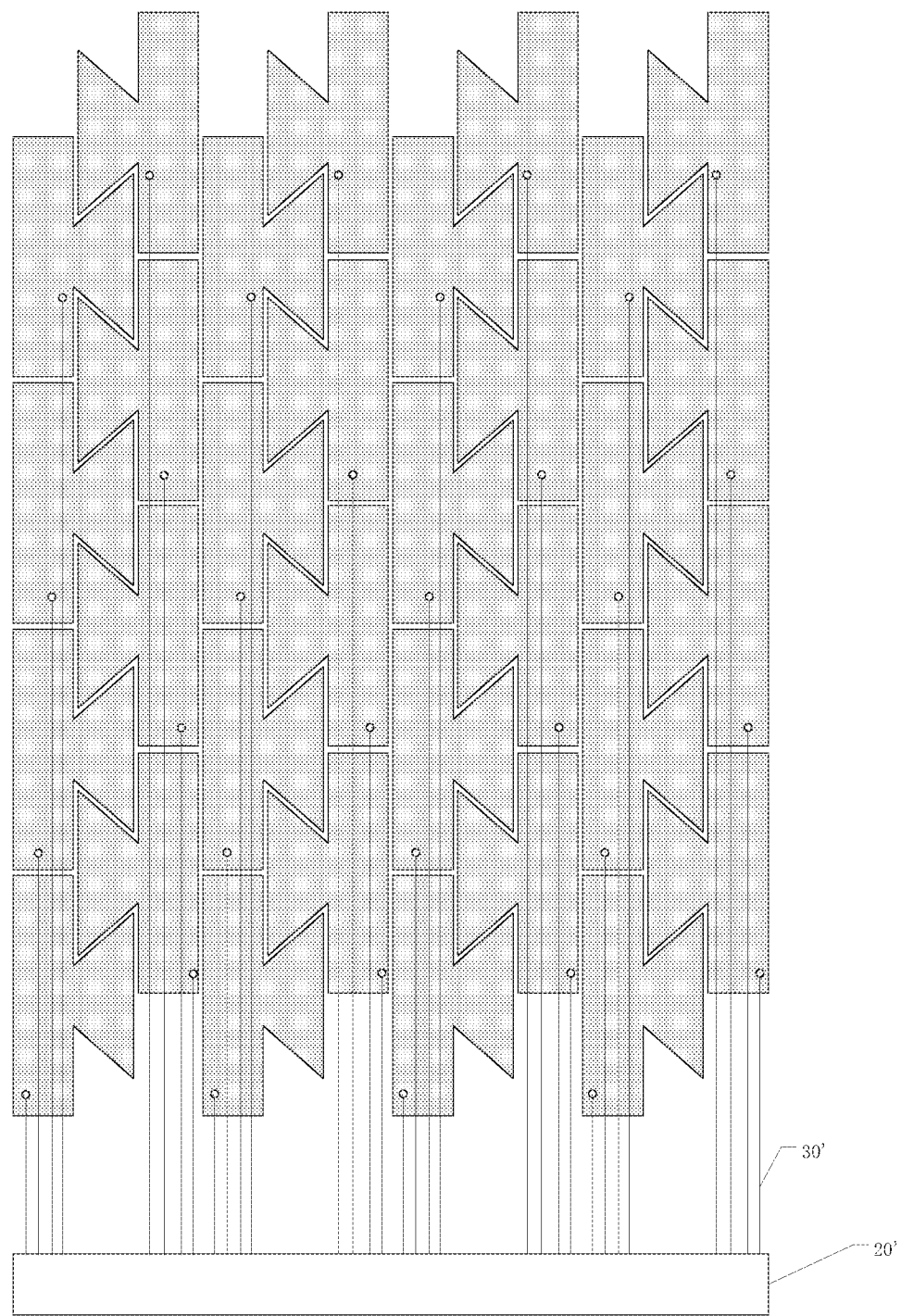
FIG. 12 is a diagram illustrating a self-capacitive touch electrode structure in some embodiments.

FIG. 12 is a diagram illustrating a self-capacitive touch electrode structure in some embodiments. Referring to FIG. 12, the self-capacitive touch electrode structure in the embodiment has a substantially T-shape, including a first portion and a second portion substantially perpendicular to the first portion. The first portion is substantially rectangular, and the second portion is substantially trapezoidal. Optionally, the rectangular first portion and the trapezoidal second portion form a first recess and a second recess. A trapezoidal second portion from an adjacent touch electrode protrudes into the first recess, and a trapezoidal second portion from another adjacent touch electrode protrudes into the second recess. The trapezoidal second portion of a touch electrode protrudes into a first recess of an adjacent touch electrode and a second recess of another adjacent touch electrode.

Figure 13:
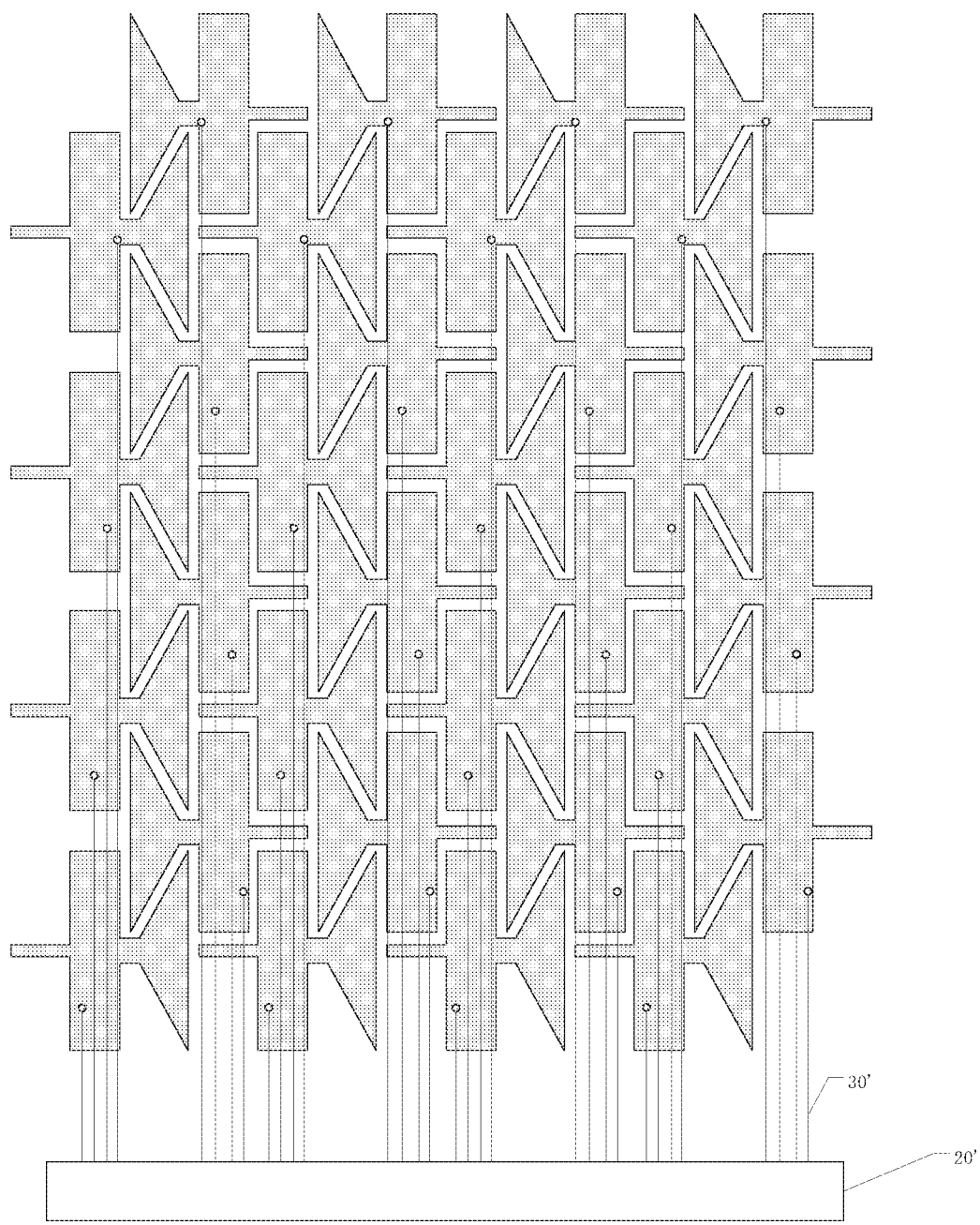
FIG. 13 is a diagram illustrating a self-capacitive touch electrode structure in some embodiments.

FIG. 13 is a diagram illustrating a self-capacitive touch electrode structure in some embodiments. Referring to FIG. 13, the self-capacitive touch electrode structure in the embodiment has a substantially airplane shape, including a nose portion, a fuselage portion, a wing portion, and a tail portion. Optionally, the wing portion is substantially rectangular, the nose portion is substantially rectangular and is substantially perpendicular to the wing portion, the fuselage portion is substantially rectangular or a square, and the tail portion is substantially trapezoidal or a triangular. Optionally, the wing portion, the fuselage portion and the tail portion form a first recess and a second recess. A tail portion from an adjacent touch electrode protrudes into the first recess, and a tail portion from another adjacent touch electrode protrudes into the second recess. The tail portion of a touch electrode protrudes into a first recess of an adjacent touch electrode and a second recess of another adjacent touch electrode. In some embodiments, each touch electrode includes a first rectangular portion, a second rectangular portion and a third rectangular portion on two sides of the first rectangular portion, and a fourth trapezoidal portion connected to the third rectangular portion, the first rectangular portion and the fourth trapezoidal portion spaced apart by the third rectangular portion. In some embodiments, each touch electrode includes a first rectangular portion, a second rectangular portion and a third trapezoidal portion on two sides of the first rectangular portion, the second rectangular portion and the third trapezoidal portion spaced apart by the first rectangular portion.

In some embodiments, the self-capacitive touch electrode structure further includes a touch detection chip connected to a plurality of touch electrodes. The touch electrodes detect touch positions based on a change in capacitance in each touch electrode.

In some embodiments, the plurality of self-capacitive touch electrodes are connected to the touch detection chip through a plurality of touch signal lines. Each self-capacitive touch electrode is charged through each touch signal line. All self-capacitive touch electrodes have about the same size and shape, the charging durations for all touch electrodes are also about the same. When a touch event occurs above a touch electrode, it induces an increase in capacitance of the touch electrode, and consequently an increased charging duration. An increased charging duration can be used to determine whether a touch event occurred. The touch position may be determined by the change of capacitance in the surrounding area.

In some embodiments, the plurality of touch electrodes and the plurality of touch signal lines are in a different layer. By having this design, the touch dead zones may be reduced.

Optionally, the H-shape electrode is symmetrical. Optionally, the H-shape electrode is non-symmetrical. Various alternative embodiments may be practiced to make the touch electrode. For instance, any of the vertical or horizontal portions in the touch electrode may have different lengths and/or widths based on various designs.

In another aspect, the present disclosure also provides a touch control display panel having a self-capacitive touch electrode as described herein.

The touch control display panel may be any appropriate type of display panel. Optionally, the display panel is a Twisted Nematic (TN) type liquid crystal display panel. Optionally, the display panel is an Advanced Super Dimension Switch (ADS) type liquid crystal display panel. Optionally, the display panel is an in-plane switch (IPS) type liquid crystal display panel.

Optionally, the touch control display panel includes a first substrate and a second substrate facing the first substrate. Optionally, the touch control display panel includes a self-capacitive touch electrode layer on the second substrate, the self-capacitive touch electrode layer being in the same layer as a common electrode layer. Optionally, the second substrate is an array substrate having a self-capacitive touch electrode layer in a same layer as the common electrode layer. Optionally, the common electrode layer may be operated as a self-capacitive touch electrode layer in a time-division driving mode. By having the design, the manufacturing cost can be lowered, and manufacturing process simplified.

In another aspect, the present disclosure provides a display apparatus having a touch control display panel as described herein. Examples of display apparatuses include, but are not limited to, a notebook computer, a monitor, a digital album, a mobile phone, a tablet computer, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A self-capacitive touch electrode structure, comprising a plurality of touch electrodes configured to independently receive a touch driving signal;

wherein the plurality of touch electrodes are self-capacitive touch electrodes, and consist essentially of a first sub-array comprising a plurality of first touch electrodes spaced apart from each other in a first periodic sub-lattice, and a second sub-array comprising a plurality of second touch electrodes spaced apart from each other in a second periodic sub-lattice;

wherein the first sub-array and the second sub-array define an array of touch electrodes comprising a plurality of touch electrode pairs in a periodic lattice, a minimum translational repeat unit of all of touch electrodes in the self-capacitive touch electrode structure consisting essentially of a pair of a respective one of the plurality of first touch electrodes and a respective one of the plurality of second touch electrodes adjacent to each other, the minimum translational repeat unit being spaced apart from neighboring minimum translational repeat unit, and the minimum translational repeat unit having equal numbers of touch electrodes from the first periodic sub-lattice and the second periodic sub-lattice, respectively;

the respective one of the plurality of first touch electrodes comprises at least one recess surrounding a protrusion of an adjacent second touch electrode of the plurality of second touch electrodes, and at least one protrusion surrounded by a recess in an adjacent second touch electrode of the plurality of second touch electrodes;

the respective one of the plurality of first touch electrodes is connected to a first touch driving signal line and configured to receive a touch driving signal from the first touch driving signal line; and the respective one the plurality of second touch electrodes is connected to a second touch driving signal line and configured to receive a touch driving signal from the second touch driving signal line;

wherein a respective one of the plurality of touch electrodes has a substantially H shape, comprising a first portion, a second portion, and a third portion sandwiched between the first portion and the second portion; the first portion is substantially parallel to the second portion and substantially perpendicular to the third portion; the first portion, the second portion, and the third portion form a first recess and a second recess; the first portion comprises a first protrusion and a second protrusion, and the second portion comprises a third protrusion and a fourth protrusion;

a first recess of a first touch electrode surrounding a first protrusion of a first adjacent second touch electrode, a second recess of the first touch electrode surrounding a second protrusion of a second adjacent second touch electrode; a first recess of a second touch electrode surrounding a first protrusion of a first adjacent first touch electrode, a second recess of the second touch electrode surrounding a second protrusion of a second adjacent first touch electrode; and the first portion has a length different from that of the second portion.

2. The self-capacitive touch electrode structure of claim 1, wherein a projection of a first touch electrode along any lattice line of the array of touch electrodes at least partially overlaps with a projection of an adjacent second touch electrode.

3. The self-capacitive touch electrode structure of claim 1, wherein the first sub-array interleaves with the second sub-array.

4. The self-capacitive touch electrode structure of claim 1, wherein the first periodic sub-lattice and the second periodic sub-lattice with respect to each other have a two-fold rotational symmetry relative to an axis perpendicular to a plane of the array, and the pair of the respective one of the plurality of first touch electrodes and the respective one of the plurality of second touch electrodes adjacent to each other in the minimum translational repeat unit has a two-fold rotational symmetry relative to an axis perpendicular to a plane of the array, and identical shape and dimension.

5. The self-capacitive touch electrode structure of claim 1, wherein a respective one of the plurality of touch electrodes has a substantially H shape.

6. The self-capacitive touch electrode structure of claim 5, wherein the pair of the respective one of the plurality of first touch electrodes and the respective one of the plurality of second touch electrodes adjacent to each other in the minimum translational repeat unit has a two-fold rotational symmetry in plan view of the array.

7. The self-capacitive touch electrode structure of claim 6, wherein the first portion has a length in the range of about 10 mm to about 12 mm, and a width in the range of about 1 mm to about 3 mm; the second portion has a length in the range of about 8 mm to about 10 mm, and a width in the range of about 1 mm to about 3 mm; and the third portion has a length in the range of about 1 mm to about 3 mm, and a width in the range of about 1 mm to about 3 mm.

8. The self-capacitive touch electrode structure of claim 1, wherein a respective one of the plurality of touch electrodes comprises a first rectangular portion, a second rectangular portion and a third rectangular portion on two sides of the first rectangular portion, and a fourth trapezoidal portion connected to the third rectangular portion, the first rectangular portion and the fourth trapezoidal portion spaced apart by the third rectangular portion.

9. The self-capacitive touch electrode structure of claim 1, further comprising a touch detection chip connected to the plurality of first touch electrodes and the plurality of second touch electrodes for detecting touch positions based on a change in capacitance in a respective one of the plurality of touch electrodes.

10. The self-capacitive touch electrode structure of claim 9, wherein the respective one of the plurality of first touch electrodes is connected to the touch detection chip through the first touch driving signal line;
the respective one of the plurality of second touch electrodes is connected to the touch detection chip through the second touch driving signal line;
the respective one of the plurality of first touch electrodes is in a different layer from the first touch driving signal line; and
the respective one of the plurality of second touch electrodes is in a different layer from the second touch driving signal line.

11. A touch control display panel, comprising the self-capacitive touch electrode structure of claim 1.

12. The touch control display panel of claim 11, comprising a first display substrate and a second display substrate opposite to the first display substrate, wherein the second display substrate comprises the self-capacitive touch electrode structure, and a common electrode layer in a same layer as the self-capacitive touch electrode structure.

13. A display apparatus, comprising the touch control display panel of claim 11.

* * * * *